J. C. W. GRETH.
CHEMICAL FEEDER AND SATURATOR.
APPLICATION FILED AUG. 12, 1907.
996,923.
Patented July 4, 1911.
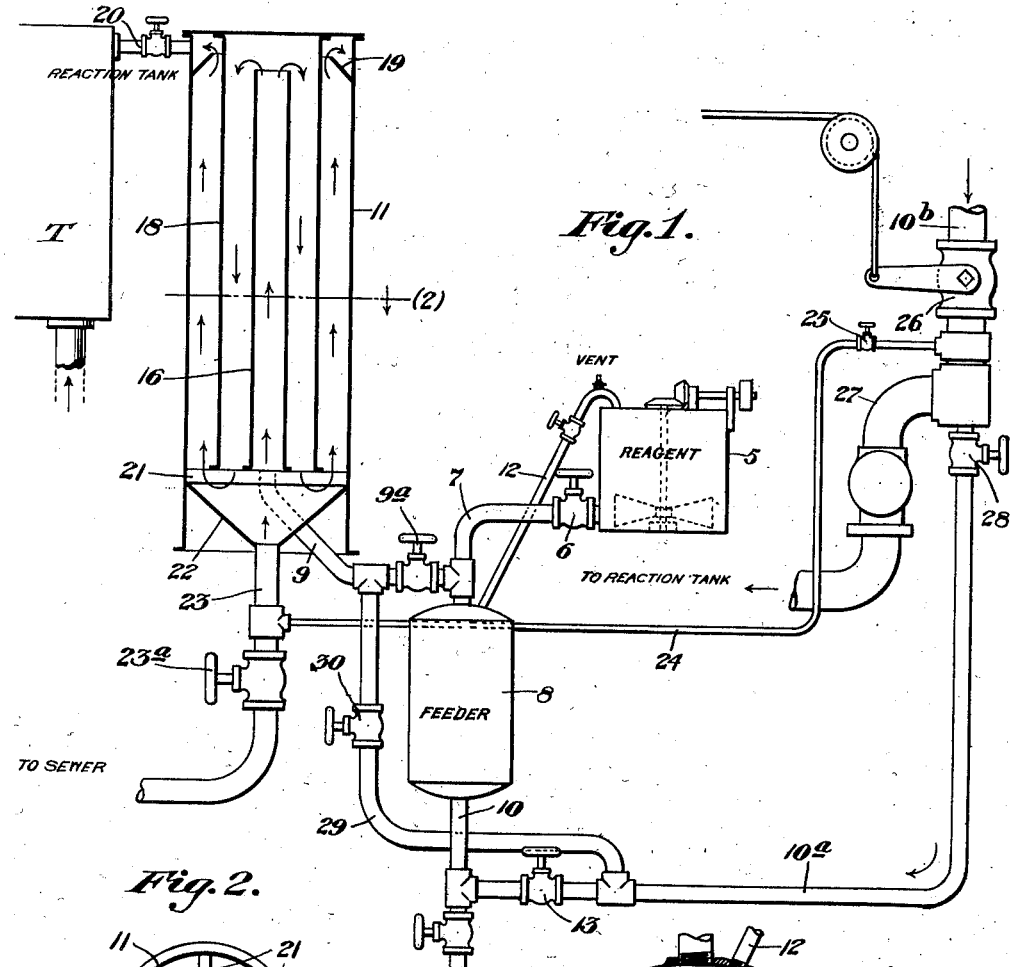
Fig. 1.
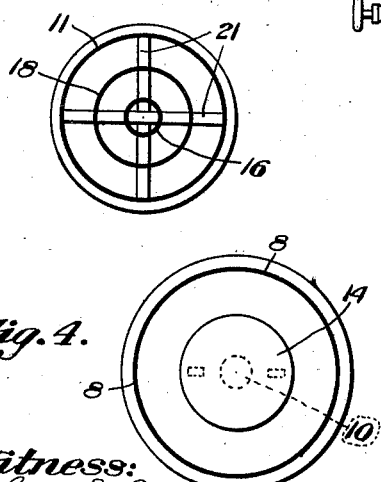
Fig. 2.
Fig. 4.
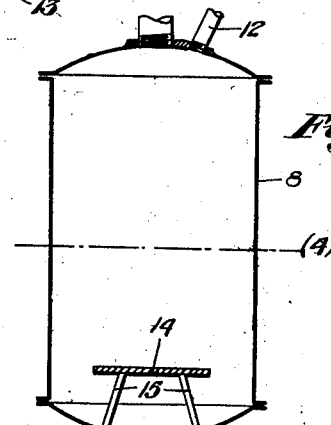
Fig. 3.
Witness:
Chas. S. Kepley
Fred Stauff
Inventor:
John C. W. Greth
By F. W. H. Clay
his Atty.

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

CHEMICAL FEEDER AND SATURATOR.

996,923.  Specification of Letters Patent.  Patented July 4, 1911.

Application filed August 12, 1907. Serial No. 388,139.

*To all whom it may concern:*

Be it known that I, JOHN C. W. GRETH, a citizen of the United States, residing at Pittsburg, in the State of Pennsylvania, have invented a certain new and useful Chemical Feeder and Saturator, of which the following is a specification.

My invention relates particularly to water purifying apparatus although it has various other applications as will hereafter be obvious, and its primary objects are to handle the chemicals such as milk of lime and efficiently introduce them into the water purifying system without passing them through a pump.

Other objects are to provide a continuously operating displacement device for gradually introducing a definite amount of chemical, to provide for efficient saturating of the chemical and to provide means for introducing the chemical into the saturating tank at the bottom and against pressure.

These objects and various other advantages to hereinafter appear are attained by the devices illustrated in the accompanying drawings, where the invention is shown as applied to a water purifying system and wherein,—

Figure 1 is a diagrammatic elevation of parts of a water purifying plant including my invention. Fig. 2 is a horizontal cross-section of a saturating tank. Fig. 3 is a central vertical section of the displacement introducer and Fig. 4 is a horizontal section of the same.

In the building of large water purifying plants where reaction and settling tanks are built some 50 to 80 feet high, it is advisable to use a saturating tank of approximately the same height, and it obviously is a decided problem how to introduce the reaction chemicals at the bottom and under such heavy head. It is practically impossible to use a pump for such materials as milk of lime because the grit soon destroys the machinery. It is obviously also highly objectionable to work with mixing devices on the top of said tanks, and it has also been pointed out in some of my prior patents that the efficiency of the chemicals is much increased by introducing them under head. I have therefore devised the present means of introducing milk of lime into a saturating tank and there saturating it in an efficient manner for use in the reaction vessels.

In Fig. 1, there is provided any convenient mixing and slaking vessel 5 for the lime and from this the milk of lime flows through valve 6 and pipe 7 into the displacement introducer 8, from whence it is carried by the pipe 9 along with the raw water taken from the supply pipe 10, 10ª, 10ᵇ, into the saturating device 11, and from this the water afterward goes to the reaction tank for use as will be understood. The rest of the apparatus need not be described since my invention resides in means for handling the lime and mixing it in the water to make a saturated solution of lime hydrate.

As shown in Fig. 1 especially, the displacement vessel 8 first receives a full charge of milk of lime flowing in by the pipe 7, the air in tank 8 meanwhile escaping through a small pipe 12 as shown in Fig. 3. After the displacement tank 8 is completely filled with milk of lime, the valve 6 on the pipe from the mixer is closed and the valve 13 on the pipe 10ª is opened and the raw water flows in through pipe 10 as indicated and gradually displaces and carries along with it the charge of milk of lime, which is thus carried into the saturator through the pipe 9. At the bottom of the tank 8 I provide a baffle plate 14 which is supported on legs 15 over the mouth of the pipe 10 and the inrushing water will thus be caused to take a rolling motion and efficiently carry out all the lime from the bottom of the tank, so that eventually every particle of lime will be carried out from the vessel 8. The milk of lime being carried along with the raw water through the pipe 9, enters into the vessel 11, first into central cylinder 16, passing directly upward and over the top edges of this cylinder which being inclosed by the sides of intermediate cylinder 18, it is caused to again flow downward under the edges of this partition 18 and finally upward again between it and the wall of the outside tank 11. The clear lime hydrate solution thence flows over the annular weir 19 and through the feed pipe 20 to the reaction tank.

The various partitions and parts of the saturating tank 11 are supported upon beams 21 and underneath these is a conical shaped bottom 22 which communicates directly with the pipe 23. This latter by way of valve 23ª is connected with the sewer for the purpose of blowing off the precipitates out of the saturator when desired, it being understood that $CaCO_3$, $Mg.(OH)_2$, $Mg.CO_3$, etc., precipitated by the lime are insoluble. Since it takes some time for the milk of lime to be changed to saturated lime water, it is evident that some particles of the lime still unused, will be carried up from cylinder 16 and down with these precipitates to the bottom. Therefore I use a small pipe 24 with a valve 25, connected to the pipe 23 and communicating directly with the main supply pipe $10^b$, behind the connections to $10^a$ and to the reaction tank. There is thus supplied a continuous stream of raw water at the extreme bottom of the saturating tank and this besides preventing any choking up of the pipe 23 by sediment, effectually utilizes whatever parts of the lime may be left unused and precipitated in the saturator.

The stop cock or valve 28 on the pipe $10^a$ is set with an opening properly designed to divert such an amount of water through the pipe $10^a$ as to cause introduction of the proper amount of saturated solution of lime hydrate to react with the impurities in the raw water introduced through the main 27. The pipe 24 and also the by-pass pipe 29 around the displacement vessel, are independent of the latter, and it will be plain that while the displacement vessel 8 is being refilled, raw water may still be supplied to the tank 11 to dissolve the excess of lime, which of course always remains therein. Thus a continuous flow of saturated solution of lime water is always kept flowing out of the saturating tank and into the reaction tank.

It will be seen from the above description that in operation the tank 8 is first filled with milk of lime, whereupon the valve 6 is closed and valves $9^a$ and 13 are opened and water flows in through pipe 10 and out through pipe 9 to the saturator carrying with it the milk of lime, and in the saturating tank a true lime hydrate solution is made by the extended vertical reverse flow and clear solution taken off by overflow at the top to the reaction tank. When the displacement tank 8 is empty of lime and a new charge is desired, valves $9^a$ and 13 are closed and valve 30 opened, whereupon the flow of water will continue in the saturator and all the lime is reduced to a hydrate solution by reason of this double current through pipes 9 and 23, any sediment precipitated from chamber 18 on the downflow being picked up and dissolved and utilized by the current from pipe 23; that is while this tank provides a main current which is vertically reversed, yet the extreme bottom of the tank has a continuously flowing current of water upward so that no sediment can collect, the pipes cannot be choked and all the lime is utilized. It will be noted that the displacement vessel 8 and the saturating vessel 11 really form parts of one continuous saturating device, and by the arrangement above described, including the constantly flowing by-pass pipe 24, the flow of saturated solution to the reaction tank T is continuous even though the displacement vessel operates intermittently. The filling of the displacement vessel 8 ordinarily takes but a few minutes, while the charge may be introduced into the system continuously during a period of ten hours or at whatever rate desired.

The advantage of having the mixing vessel 5 and all the valves on the ground at the base of the saturating and reaction towers, will be readily apparent, and in short the introduction of the lime into the system is accomplished in a thoroughly accurate and efficient and entirely controllable manner.

Of course any other chemical having similar properties to that described can be used by the same apparatus and it will also be evident to those skilled in the art that there are various other uses for the devices described.

Having thus described my invention and illustrated its use, what I claim as new and desire to secure by Letters Patent is the following:

1. In water purifying apparatus, the combination with a water supply, a reagent supply, and a reaction tank, of a pipe direct from the water supply to the reaction tank, a saturator and closed connection from the water supply to the saturator, a displacement feeding vessel and connections to fill it with the reagent and empty it into the saturator, including a closed pipe from the water supply to the displacement vessel, whereby a deviated proportional part of the water supply may displace in said vessel and discharge into the saturator an equal amount of the reagent.

2. In water purifying apparatus, the combination with a water supply, a reaction tank and a chemical supply, of a main feed pipe from the water supply direct to the reaction tank, a branch pipe from said supply direct to the saturator, a displacement feeding device for the reagent operated by part of the water supply, and a by-pass around the displacement vessel.

3. In water purifying apparatus, the combination with a reaction tank and water supply, of a saturating vessel having a continuously flowing branch from the water supply thereto, a reagent supply and a reagent feeder operated by displacement and connected to the saturator, comprising a closed vessel with a reagent inlet at the top and a water inlet at its extreme bottom and a second or by-pass pipe shunted around the feeder direct to the saturator, substantially as described.

4. The combination of a saturating tank, a water supply, and a reagent supply, a displacement vessel in the line of the connection from the water supply to the said tank, and connections to flow water upward therethrough to carry in a reagent, a by-pass around the displacement vessel, and a supplementary by-pass directly from the main supply to the extreme bottom of the saturating tank.

5. In water purifying apparatus, the combination with a saturating tank, a reagent supply, and a reagent feeder operated by a deviated part of the water supply, of a by-pass around the feed, and a supplementary by-pass directly from the main supply to the saturating tank, whereby to continue a water-flow thereto when the feeder is not in operation.

6. In water purifying apparatus, a saturating tank having partitions to cause reverse vertical flow therethrough, a conical bottom under all said partitions, means to introduce chemicals under head into one of the compartments, and a supplementary water supply pipe connected to the apex of the conical bottom, whereby to stir up the sediment in the tank, substantially as described.

7. In water purifying apparatus, a saturator comprising means to introduce lime into a central compartment and circulate it radially outward and in reverse vertical currents, and means for introducing raw water at the extreme bottom of the tank to utilize the undissolved lime, substantially as described.

In testimony whereof, I have hereunto signed my name in the presence of the two subscribed witnesses.

JOHN C. W. GRETH.

Witnesses:
F. W. H. CLAY,
CHAS. S. LEPLEY.